UNITED STATES PATENT OFFICE.

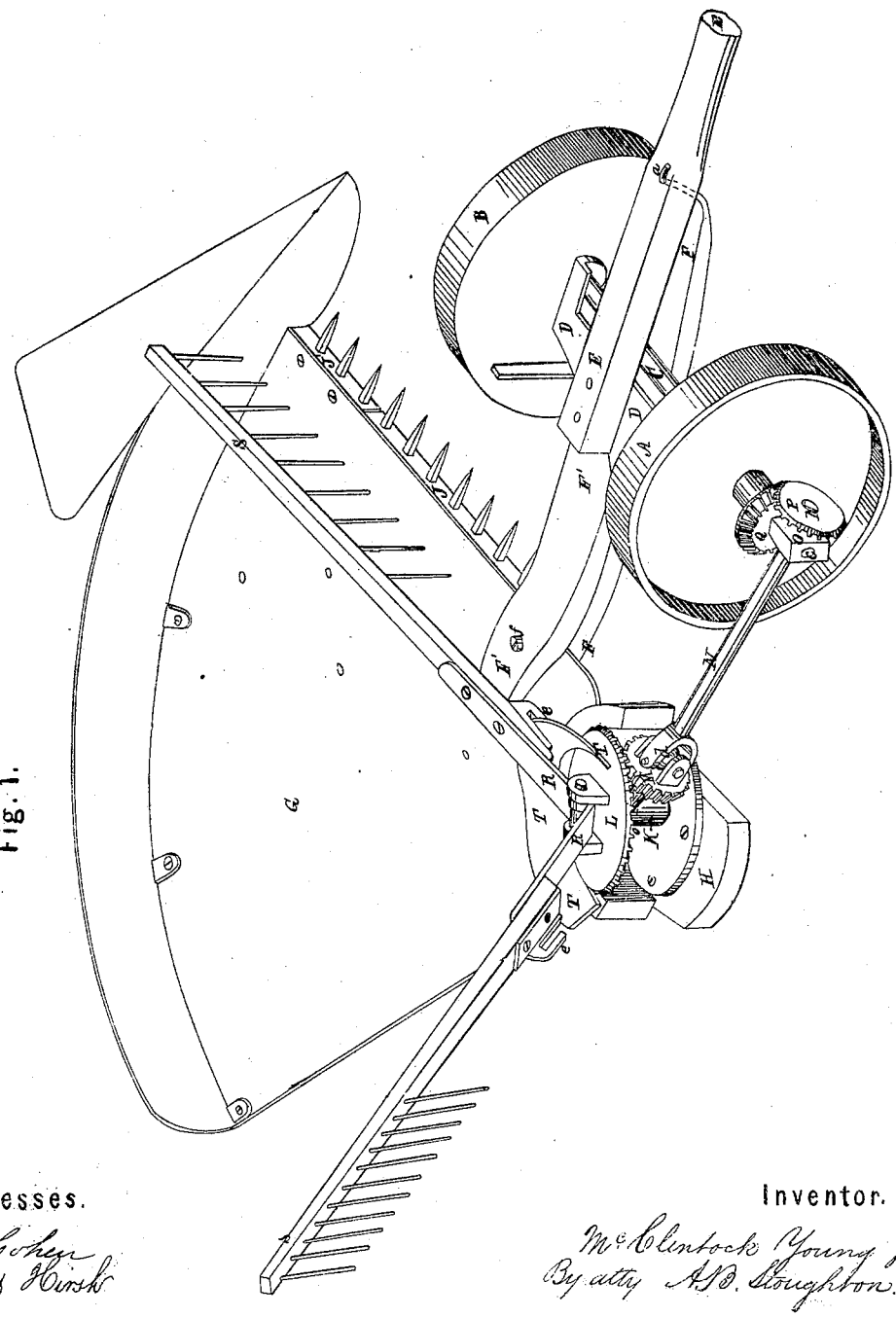

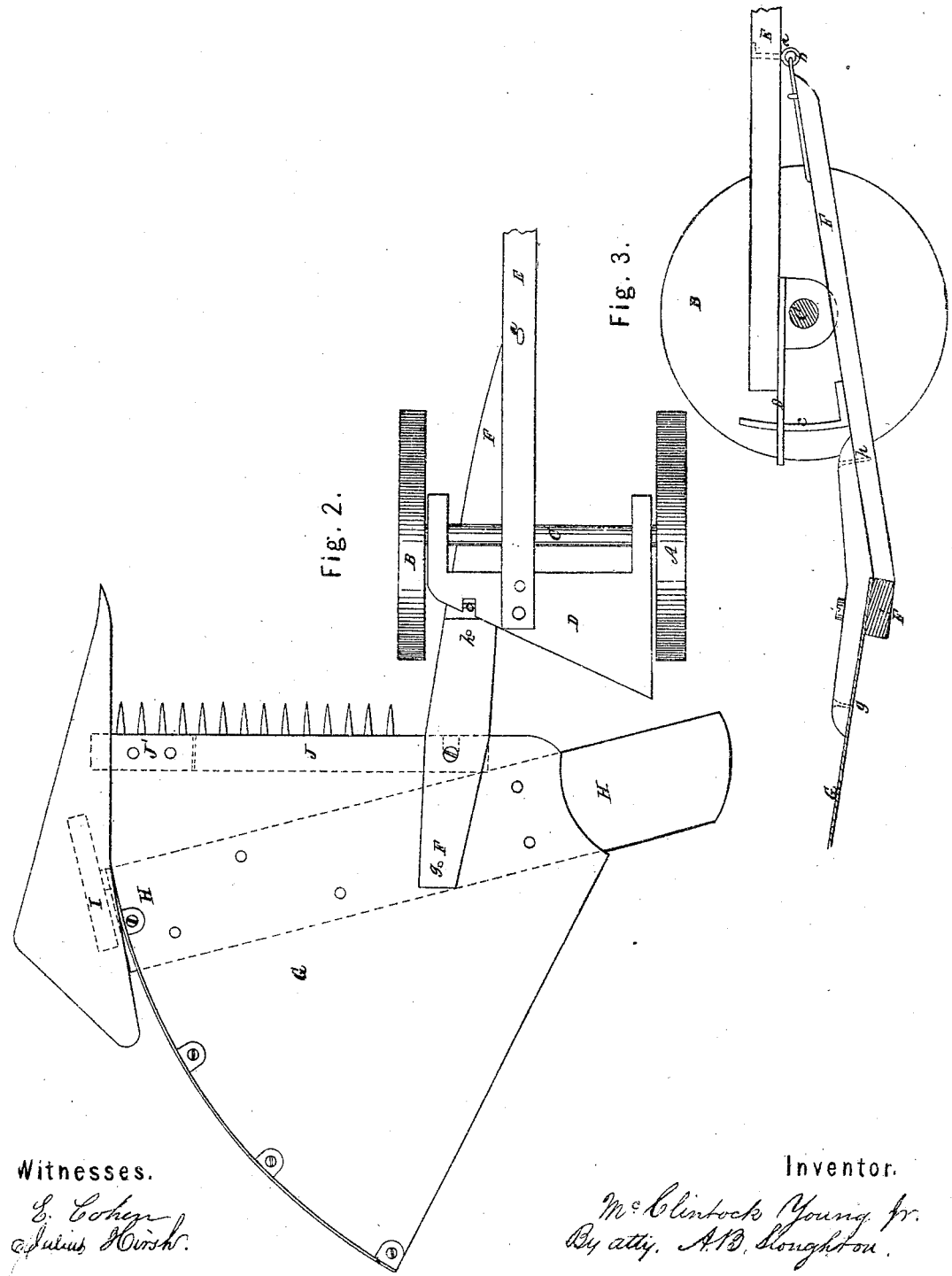

McCLINTOCK YOUNG, JR., OF FREDERICK, MARYLAND.

IMPROVEMENT IN HARVESTERS.

Specification forming part of Letters Patent No. 32,807, dated July 9, 1861.

*To all whom it may concern:*

Be it known that I, McCLINTOCK YOUNG, Jr., of Frederick, in the county of Frederick and State of Maryland, have invented certain new and useful Improvements in Harvesting-Machines; and I do hereby declare the following to be a full, clear, and exact description of the same, reference being had to the accompanying drawings, making a part of this specification, in which—

Figure 1 represents in perspective so much of a harvesting-machine as will illustrate my invention. Fig. 2 represents a top plan, and Fig. 3 represents a sectional elevation, of the same.

Similar letters of reference, where they occur in the separate figures, denote like parts of the machine in all the drawings.

My invention relates to a combined reaping and mowing machine, or, in other words, to a harvesting-machine capable of being converted into a reaping or mowing machine, as the case may be; and my invention consists, first, in the manner of connecting the platform and cutting apparatus with the main frame, so that they may rise and fall, in conforming to the surface of the ground, independent of each other.

It consists, secondly, in combination with the platform and main frame so hung on the main wheels, of a rake and rake-driving mechanism that will admit of such independent movements, and yet remain in working gear with each other; and it consists, thirdly, in making the finger-bar in two sections of different lengths, the long section being attached to the main frame and the short section to the platform, so that when the platform is removed to convert the machine into a grass-mower the finger-bar shall be shortened in length to the extent of the short section attached to the platform.

To enable others skilled in the art to make and use my invention, I will proceed to describe the same in connection with the drawings.

A B represent two supporting-wheels on an axle, C, the wheel B being fast on the axle, so as to make it a drive-wheel also.

On the axle C is supported a frame, D, to which the tongue E is attached, and to the tongue E, at or about the point *a* thereon, is connected by a shackle or link connection, *b*, Fig. 3, a beam, F, that passes underneath the axle C, and thence rearward to support the platform, cutting apparatus, rake, and rake-driving mechanism, as will be explained. A brace, *c*, extends upward from the beam F, which passes up through a notch, mortise, or guide on the main frame D, so as to keep this beam in line, while it or the main frame is free to move vertically, as the ground over which they are passing may demand. The platform G is fastened to a platform beam or support, H, which is oblique to and behind the finger-bar, and at the outer end of this support is the outside supporting-wheel, I, Fig. 2. The finger-bar is made in two sections, J and J', the one J, which is much the longer one, being secured to the beam F, and the short section J' to the platform G, the object of this being to have a short finger-bar and cutter when mowing and a longer one when reaping, and to make the change without removing or detaching the finger-bar from the main frame to apply another in its place.

On the end of the platform-beam H next the stubble there is a pillow-block box, K, in which the journal of a bevel-wheel, L, is supported and turned, and upon this pillow-support K there is a horizontal arm-support, *o*, on which, as a journal and slide, the bevel-pinion M is supported and turns. To the pinion M is connected by a gimbal-joint, as at *d*, Fig. 1, one end of a driving-shaft, N, the other end whereof is supported in a bearing-block, O, upon the projected end of the axle C, and the extreme end of the shaft N has a bevel-pinion, P, upon it, which is turned by the bevel-wheel Q on the axle C. This arrangement of driving-gear, though shown outside of the supporting-wheel A, may be put inside or between the wheels A B. The bevel-pinion M turns the bevel-wheel L, and on top of this wheel L is pivoted the rake-shank R, to which the rakes S S are connected and by which they are rotated.

T is a cam-ledge, under which hooks or arms *e* on the rake-stocks take to draw the rakes down to and make them traverse close over the platform, the one going down raising up its fellow high enough to pass over the wheels, and then drop onto or close to the platform.

When this machine is arranged for mowing, everything is taken off except the beam F and the finger-bar J, and which may be done by simply loosening up a screw, *f*. When made into a reaper, a saddle-block, F', is added to the beam F, which has studs or dowels $g\ h$ in it—one for holding the platform, the other for holding itself, in connection with the screw $f$, to the beam F. Where the sections of the finger-bar butt together, there may be any suitable kind of fastening to keep them together and in line. For cutting grain, the finger-bar and cutters may be from five to six feet in length; but for grass a four-feet swath, or four and a half feet, is found to be enough, and for this object I make my finger-bar in sections.

Having thus fully described my invention, what I claim is—

1. Connecting the finger bar of a grass-harvesting machine to the main frame by means of a beam, F, linked or hinged to and drawn by the tongue, and prevented from swaying laterally by the brace $c$ and main frame D, as set forth.

2. In combination with said beam F, so hung and supported, a platform, rake, and rake mechanism, arranged and connected thereto, to operate as set forth, for converting the machine into a self-raking grain-harvester, substantially as described.

3. Making a finger-bar in two sections, one long one and one short one, the short section being connected to the platform and removable with it, so that as the platform is attached to adapt the machine to harvesting grain, or removed to adapt it to the cutting of grass, the finger-bar shall be correspondingly lengthened and shortened, as has been found advantageous in harvesting the different materials, substantially as described.

McCLINTOCK YOUNG, JR.

Witnesses:
A. B. STOUGHTON,
JULIUS HIRSCH.